US009020237B2

(12) United States Patent
Hirai et al.

(10) Patent No.: US 9,020,237 B2
(45) Date of Patent: Apr. 28, 2015

(54) METHOD FOR OPTIMIZING OBSERVED IMAGE CLASSIFICATION CRITERION AND IMAGE CLASSIFICATION APPARATUS

(75) Inventors: Takehiro Hirai, Ushiku (JP); Kozo Miyake, Hitachinaka (JP); Junko Konishi, Hitachinaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 227 days.

(21) Appl. No.: 13/702,674

(22) PCT Filed: May 13, 2011

(86) PCT No.: PCT/JP2011/002661
§ 371 (c)(1),
(2), (4) Date: Dec. 7, 2012

(87) PCT Pub. No.: WO2011/155123
PCT Pub. Date: Dec. 15, 2011

(65) Prior Publication Data
US 2013/0077850 A1   Mar. 28, 2013

(30) Foreign Application Priority Data
Jun. 7, 2010   (JP) .................. 2010-129521

(51) Int. Cl.
*G06K 9/00* (2006.01)
*G06T 7/00* (2006.01)

(52) U.S. Cl.
CPC ........... *G06T 7/0004* (2013.01); *G06T 2200/24* (2013.01); *G06T 2207/10061* (2013.01); *G06T 2207/30148* (2013.01)

(58) Field of Classification Search
None
See application file for complete search history.

(56) References Cited

U.S. PATENT DOCUMENTS

| 6,922,482 B1 | 7/2005 | Ben-Porath |
| 2006/0233434 A1 | 10/2006 | Hamamatsu et al. |
| 2008/0075352 A1 | 3/2008 | Shibuya et al. |

FOREIGN PATENT DOCUMENTS

| JP | 2001-189362 | 7/2001 |
| JP | 2003-515942 | 5/2003 |
| JP | 2006-300517 | 11/2006 |
| JP | 2009-103508 | 5/2009 |
| JP | 2010-87322 | 4/2010 |
| WO | WO 01/40145 A2 | 6/2001 |

*Primary Examiner* — Stephen R Koziol
*Assistant Examiner* — Amandeep Saini
(74) *Attorney, Agent, or Firm* — Baker Botts, LLP

(57) ABSTRACT

A first object is to use both ADC (automatic defect classification) and MDC (manual defect classification) and reduce the amount of MDC operation. A second object is to prevent a DOI (defect of interest) from being missed.
The first object is achieved by displaying judgment information on a screen. The judgment information is necessary when part of the classification is performed by ADC and part of the classification is performed by MDC and used to judge which classification is used, ADC or MDC. In the display operation, ADC classification results and MDC classification results are also displayed in the form of matrix. Further, a missed DOI rate is calculated for each classification threshold used in the defect classification and displayed on the screen.

6 Claims, 13 Drawing Sheets

|  |  | EXPECTED VALUE | |
|---|---|---|---|
|  |  | POSITIVE | NEGATIVE |
| MEASURED VALUE | POSITIVE | TRUE POSITIVE | FALSE NEGAGIVE |
|  | NEGATIVE | FALSE POSITIVE | TRUE NEGATIVE |

(B)

| | | ADC RESULT | | ACCURACY(%) |
|---|---|---|---|---|
| TRUE CLASSIFICATION RESULT | | CATEGORY A | CATEGORY B | |
| | CATEGORY A | a | b | a/(a+b) |
| | CATEGORY B | c | d | d/(c+d) |
| | PURITY(%) | a/(a+c) | d/(b+d) | (a+d)/(a+b+c+d) |

(C)

JUDGMENT CRITERION  [ PURITY ≧ 80% ]  ~405

CATEGORY THAT REQUIRES MDC OPERATION→C  ~402

→ADC RESULT

| | A | B | C | ACCURACY(%) |
|---|---|---|---|---|
| CATEGORY A | 55 | 2 | 3 | 92 |
| CATEGORY B | 5 | 25 | | 83 |
| CATEGORY C | | 1 | 9 | 90 |
| PURITY(%) | 92 | 89 | 75 | 89 |

MDC RESULT ↓

401, 404, 403

FIG. 9
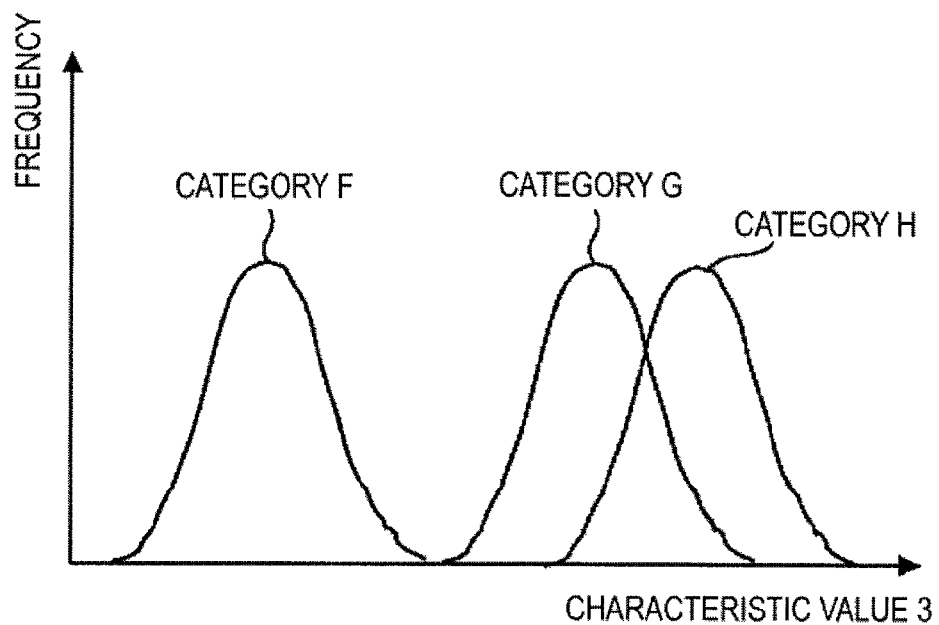
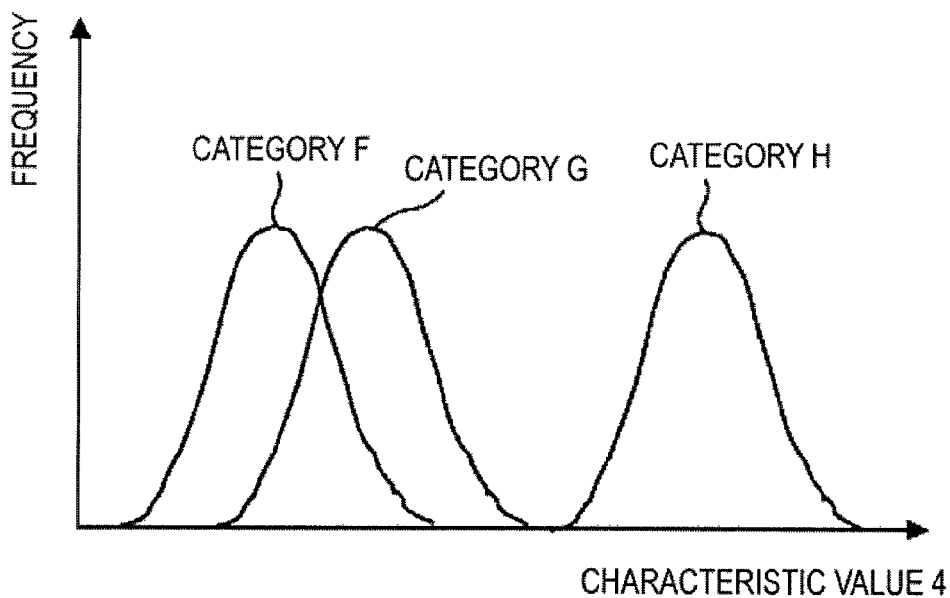

METHOD FOR OPTIMIZING OBSERVED IMAGE CLASSIFICATION CRITERION AND IMAGE CLASSIFICATION APPARATUS

TECHNICAL FIELD

The present invention relates to a method for optimizing an observed image classification criterion in order to identify a cause of a defect by observing a sample under a variety of observation conditions based on recipes having the observation conditions registered therein and classifying the observed images on a defect type basis. The present invention also relates to an observation apparatus. The present invention particularly relates to a technology that is effective in a case where an optimum classification criterion changes in accordance with characteristics of a sample, manufacturing steps, and a defect of interest (DOI) in a user's environment, as in the case of a SEM-based (scanning electron microscope) observation apparatus.

BACKGROUND ART

In a manufacturing step of forming a minute pattern on a substrate, for example, when a semiconductor device or a liquid crystal apparatus is manufactured, to ensure a high yield, it is important to quickly locate a defect produced in a manufacturing step and take measures against the defect. In recent years, as semiconductor devices are increasingly miniaturized, even a minute defect can have a nonnegligible effect on the yield, and the number of types of defects to be observed has been increasing.

A SEM-based observation apparatus is used to observe such a variety of defects based on information on the position of a defect detected by an inspection apparatus that is typically a higher-level apparatus. Further, to identify a problematic manufacturing step, defects are classified on a defect type basis. The performance of observation apparatus has been dramatically improved, allowing observation of more minute defects. The improved performance along with improvement in throughput dramatically increases the number of acquirable observed images, which encourages development of a technology for automating classification of observed defects on a defect category basis (on a defect type basis) by using acquired images.

The function of automating defect classification is called ADC (automatic defect classification), and Patent Literature 1, for example, discloses a method for automatically classifying a defective portion by quantifying characteristics of the defect portion and using the quantified characteristic values.

Further, Patent Literature 2 discloses an invention that allows ADC results to be displayed in the form of confusion matrix.

CITATION LIST

Patent Literature

PTL 1: JP-A-2001-135692 (U.S. Pat. No. 6,922,482)
PTL 2: JP-A-2008-082821 (United States Patent Application Publication No. 2008/0075352)

SUMMARY OF INVENTION

Technical Problem

The ADC described above is, however, insufficient in terms of classification performance as compared with manpower-based MDC (manual defect classification). This is a reason why MDC has been replaced with ADC in a limited sense or ADC has not been widely used. A lot of time is therefore spent to carry out MDC, which causes a problem of a large burden on a user of an observation apparatus.

There has been an increasing need to reduce the burden of MDC operation by replacing part of MDC with ADC although full replacement of MDC with ADC is not possible.

A primary object of the invention is to provide a method for optimizing an ADC recipe for reducing the burden of MDC operation and an observation apparatus having an ADC capability.

Solution to Problem

An ADC function provided in a defect observation apparatus or a defect inspection apparatus of related art is so designed that ADC or MDC is chosen. That is, an observation apparatus of related art offers only two choices, defect classification entirely relying on the apparatus or entirely relying on manpower-based manual classification. In other words, the apparatus does not have a function of performing part of the defect classification by using the apparatus and performing part of the defect classification by manual classification, that is, performing the defect classification by an arbitrary combination of ADC and MDC.

The object of the invention is achieved by displaying judgment information on a screen that is used to judge which category needs to undergo MDC classification. The judgment information is preferably displayed on screen display means on which ADC results are displayed along with the ADC results from the viewpoint of ease of operation but can alternatively be displayed on another screen.

Advantageous Effects of Invention

According to the invention, the amount of manpower-based operation in classification of defect images detected as a result of defect review can be reduced. Further, defect observation results can be quickly fed back to manufacturing steps, whereby the manufacturing yield can be improved.

BRIEF DESCRIPTION OF DRAWINGS

FIG. 4 describes a confusion matrix;
FIG. 9 is a conceptual diagram for describing the concept of parameter optimization in a classification algorithm in which setting a weight to a characteristic value is the parameter;

DESCRIPTION OF EMBODIMENTS

First Embodiment

A first embodiment will be described with reference to an example of the configuration of a SEM-based defect observation apparatus having a function of displaying judgment information used to judge which classification is used, ADC or MDC, in a confusion matrix.

A SEM-based defect observation apparatus acquires a high-definition SEM image in a position on a sample where a defect is detected by an external defect detection apparatus, such as an optical or SEM-based visual inspection apparatus, and classifies the acquired high-definition SEM image based on a predetermined criterion. On the other hand, the performance of observation apparatus has been dramatically improved as described in "Background Art," and the number of defect images acquirable per hour in defect observation has reached several hundreds several thousands. It is practically impossible to manually classify such an extremely large number of defect images by using manpower, and introduction of ADC is essential to perform defect classification of defect images many enough to provide a feedback to a manufacturing step. However, the classification performance of current ADC is not believed to be sufficient as described in "Background Art," and it is inevitable to perform manpower-based MDC on defects that belong to certain categories.

In the present embodiment, judgment information representing which category contains reliable ADC results and which category contains unreliable ADC results is computed by using ADC and MDC results from part of defect images acquired from a sample under observation and displayed on a display section 206. Judgment information used to judge which classification is used, ADC or MDC, is thus presented to a user of the apparatus.

Figure 1:
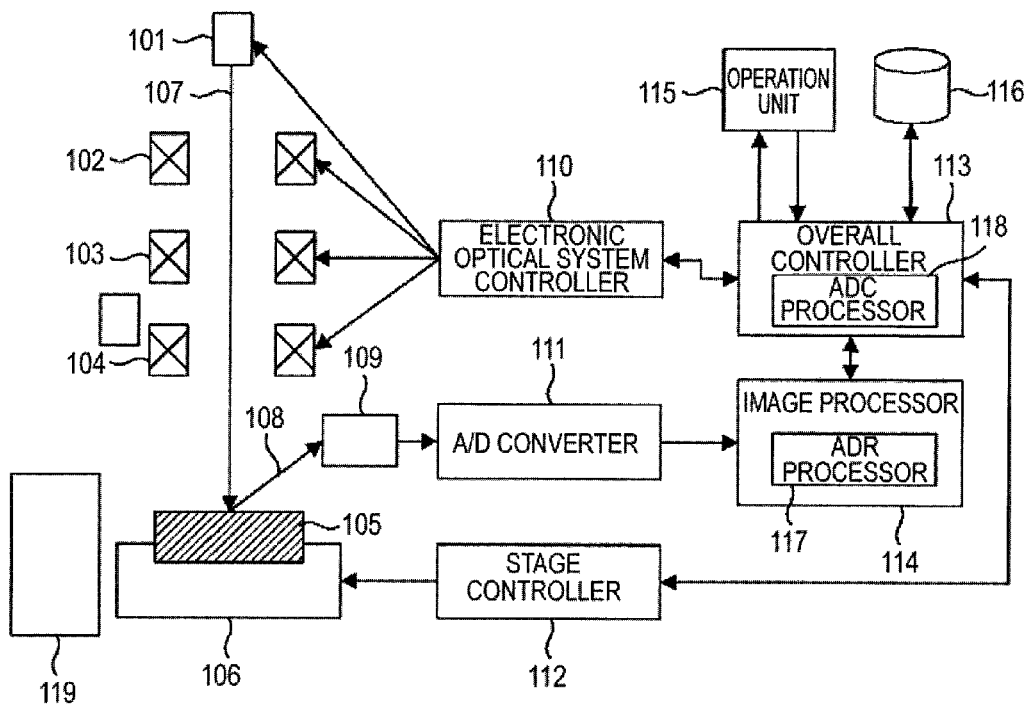
FIG. 1 is a configuration diagram of a SEM-based defect observation apparatus.

FIG. 1 is a schematic view showing the overall configuration of the SEM-based defect observation apparatus according to the present embodiment. The SEM-based defect review apparatus shown in FIG. 1 includes an electronic optical system formed of an electron gun 101, a lens 102, a scan deflector 103, an objective lens 104, a sample 105, a secondary particle detector 109, and other optical elements; a stage 106 that moves a sample table that holds the sample under observation in an XY plane; an electronic optical system controller 110 that controls the variety of optical elements provided in the electronic optical system; an A/D converter 111 that quantizes an output signal from the secondary particle detector 109; a stage controller 112 that controls the stage 106; an overall controller 113; an image processor 114; an operation unit 115 that allows an operator to operate the apparatus; a storage device 116 including a recording medium that stores control information used to control the defect review apparatus and image data used to perform ADR or ADC, which will be described later; and an optical microscope 119. Further, the electronic optical system, the electronic optical system controller 110, the A/D converter 111, the stage 106, and the stage controller 112 described above form a scanning electron microscope that is imaging means for capturing a SEM image.

A primary electron beam 107 emitted from the electron gun 101 is focused by the lens 102, deflected by the scan deflector 103, focused again by the objective lens 104, and then irradiates the sample 105. The sample 105 irradiated with the primary electron beam 107 produces secondary particles 108, such as secondary electrons and reflected electrons, in accordance with the shape and the material of the sample. The thus produced secondary particles 108 are detected by the secondary particle detector 109 and then converted by the A/D converter 111 into a digital signal. The digital signal obtained by converting an output signal from the secondary particle detector is also referred to as an image signal in some cases. The output signal from the A/D converter 111 is inputted to the image processor 114 and forms a SEM image. The image processor 114, which includes an ADR processor 117 that performs defect detection and other types of image processing by using the produced SEM image, performs a variety of types of image processing.

The lens 102, the scan deflector 103, the objective lens 104, and other optical elements in the electronic optical system are controlled by the electronic optical system controller 110. The positional control of the sample is performed by the stage 106, which is controlled by the stage controller 112. The overall controller 113 oversees and controls the entire SEM-based defect observation apparatus, interprets inputs from a keyboard 207, a mouse 208, and the storage device 116 to control the electronic optical system controller 110, the stage controller 112, the image processor 114, and other components, and outputs processing results to a display section 206 provided in the operation unit 115 and the storage device 116 as required. Automatic defect classification is performed by the overall controller 113, which includes an ADC processor 118 for performing ADC. The ADC processor 118 performs ADC based on defect images extracted by the ADR processor or those accumulated in the storage device 116.

The ADR processor 117 or the ADC processor 118 described above can be implemented in the form of hardware or software. When the ADR processor 117 or the ADC processor 118 is formed of hardware, a plurality of computing elements that carry out processes necessary for ADR or ADC are integrated on a wiring substrate or in a single semiconductor chip or package. When the ADR processor 117 or the ADC processor 118 is formed of software, a high-speed general-purpose CPU is incorporated in the ADR processor 117 or the ADC processor 118, and a program that carries out ADR or ADC processes is executed.

Figure 2:
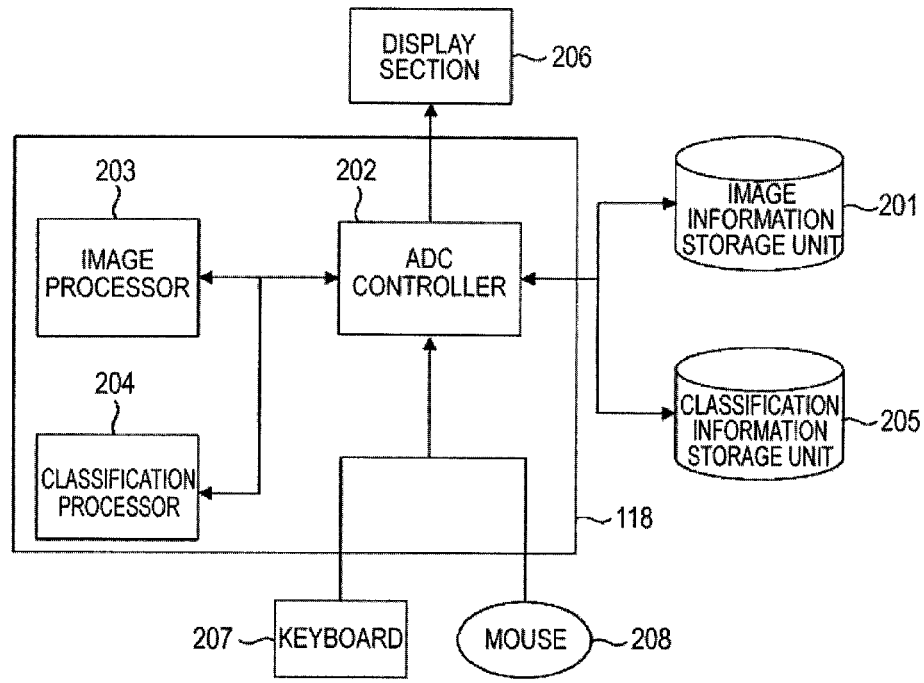
FIG. 2 is a configuration diagram of an observed image classification apparatus.

FIG. 2 shows the ADC processor 118 shown in FIG. 1 in more detail. The ADC processor 118 shown in FIG. 2 is formed of a plurality of functional blocks implemented by a CPU provided in the overall controller 113 shown in FIG. 1 and executing a predetermined program. The ADC processor 118 includes an ADC controller 202 that controls overall ADC processing, an image processor 203 that performs preprocessing necessary for defect classification, and a classification processor 204 that performs actual defect classification based on image data having undergone the preprocessing performed by the image processor 203. The functional blocks described above can alternatively be implemented by hardware. In this case, computing elements that implement the ADC controller 202, the image processor 203, and the classification processor 204 are integrated in a semiconductor device, which is disposed in the overall controller 113.

An image information storage unit 201 that stores image data having undergone the preprocessing performed by the image processor 203 is connected to the ADC processor 118, and a classification information storage unit 205 that stores results of classification performed by the classification processor 204 is also connected to the ADC processor 118. The classification information storage unit 205 further stores MDC result information as verification data used to verify ADC results. The storage units described above physically correspond to partitions, logical volumes, or file systems provided in the storage device 116. The operation unit 115, which is formed of the keyboard 207 and the mouse 208, and the display section 206, on which ADC results and a GUI (graphical user interface) that issues instructions to the apparatus are displayed, are also connected to the ADC processor 118.

Image information on defect images acquired with the scanning electron microscope, which is imaging means, is saved in the image information storage unit 201. The ADC controller 202 first reads image information from the image information storage unit 201 and forwards it to the image processor 203. Based on the forwarded image information, the image processor 203 calculates corresponding data, such as a variety of characteristic values of observed images necessary for classification including the dimensions, shape, brightness distribution, and texture of a defective portion or the dimensions, shape, brightness distribution, and texture of a background pattern, and the positional relationship between the defective portion and the background pattern, and saves the calculated data in the image information storage unit 201.

The ADC controller 202 then reads the characteristic value data of observed images saved in the image information storage unit 201 and forwards the read data to the classification processor 204. The classification processor 204 performs defect classification based on a predetermined classification model and saves the processing result in the classification information storage unit 205.

The classification model can be classified into a teaching type and a rule-based type. In the teaching-type classification model, a classifier is automatically formed based on taught characteristic value data related to correct classification results. For example, a characteristic value space based on taught data is divided by specified boundaries, and the resultant subspaces are related to categories. A defect to be classified can be classified into one of the categories by identifying which characteristic value subspace the defect belongs to. To define boundaries in the characteristic value space, there are a method for classifying a defect into a category to which a taught defect closest to the defect under classification in the characteristic value space belongs, a method for estimating a characteristic value distribution associated with each defect category based on taught data and classifying a defect into a category where a characteristic value of the defect under classification most probably occurs, and other methods. The methods described above are basic teaching-type classification models.

On the other hand, the rule-based classification model is a method for classifying a defect in accordance with a rule described, for example, in an if-then-else form. A typical example of the rule-based classification model has a binary tree structure in which a set containing defects under classification is repeatedly divided into two and the defects are eventually classified into categories. The classification model is practically implemented as an expert system and a BRMS (business rules management system). To apply a rule-based algorithm to ADC in a semiconductor or liquid crystal device inspection/observation apparatus, projections and depressions of a defective portion, the positional relationship between the defective portion and a background pattern, and other factors are defined as basic rules in many cases.

A program executed to perform defect classification based on a classification model is stored in the storage device 116, and the CPU in the overall controller 113 executes the program to provide the classification function of the classification processor 204. A variety of processes can be carried out and data to be processed can be selected by using the operation unit 115, which is formed of the keyboard 207 and the mouse 208, to issue instructions. The display section 206 displays the executions of the instructions, classification processes, and saving processes described above, and the user of the apparatus can check how the ADC processing is carried out by looking at the displayed information. The ADC processor 118 is not necessarily provided in the overall controller 113 but may be implemented by information processing means provided independently of the overall controller. Further, a plurality of information processing means connected to the overall controller 113 can carry out the same ADC processing in parallel.

The concept of the confusion matrix will next be described.

In general, to evaluate a classification model for a certain type of classification, a classification table called a confusion matrix is used in many cases. The confusion matrix is a table that displays the number of correctly classified defects by a model and the number of erroneously classified defects by the model in the form of matrix, and the confusion matrix is basically expressed in a format formed of the following four elements: true positive; false positive; false negative; and true negative.

The meanings of the true positive, false positive, false negative, and true negative described above are as follows:
True positive: The number of defects classified as positive by a model, which is found to be true, that is, actually positive,
False positive: The number of defects classified as positive by the model, which is found to be false, that is, actually negative,
False negative: The number of defects classified as negative by the model, which is found to be false, that is, actually positive, and
True negative: The number of defects classified as negative by the model, which is found to be true, that is, actually negative.

When the confusion matrix shown in FIG. 4(A) is used to evaluate whether ADC results are correct, the confusion matrix expressed in the format shown in FIG. 4(B) is used in many cases. The confusion matrix shown in FIG. 4(B) is a classification table that displays ADC results in the horizontal direction and true classification results in the vertical direction in the form of matrix. In the example shown in FIG. 4(B), the number of defects classified by ADC into a category A and found to have a true classification result of the category A (true positive) is "a"; the number of defects classified by ADC into the category A but found to have a true classification result of a category B (false positive) is "c"; the number of defects classified by ADC into the category B but found to have a true classification result of the category A (false negative) is "b"; and the number of defects classified by ADC into the category B and found to have a true classification result of the category B (true negative) is "d". To actually create a confusion matrix, MDC results are used as the true classification results.

As an index for evaluating the correctness of ADC, the following two indices shown in FIG. 4(B) are used: the purity of ADC classification correctness rate (hereinafter referred to as Purity) and the accuracy of the ADC classification correctness rate (hereinafter referred to as Accuracy). Purity is an index showing classification performance and represents the purity of ADC results. That is, Purity is a value calculated by using the total number of defects in a category into which ADC has classified the defects as the denominator and the number of correctly classified defects in the category as the numerator. It can be said that greater Purity means more reliable ADC results.

On the other hand, Accuracy is a value calculated by using the number of MDC results in a category of interest in a confusion matrix, that is, the total number of defects that must be classified into the category as the denominator and using the number of defects correctly classified by ADC into the category as the numerator. It can be said that greater Accuracy means a smaller number of missed defects that must be classified into the category.

In the confusion matrix shown in FIG. 4(B), Purities associated with the categories A and B are calculated by a/(a+c) and d/(b+d), respectively. Accuracies associated with the categories A and B are expressed by a/(a+b) and d/(c+d), respectively. To simply show the ADC correctness rate without making detailed analysis using a confusion matrix, a value calculated by using (a+d)/(a+b+c+d), which represents an overall correctness rate, is used in many cases.

In the present embodiment, information on Purity and Accuracy described above is used as judgment information representing which category contains reliable ADC results and which category contains unreliable ADC results.

In general, considering variations due to individual difference and physical conditions of the individuals in manpower-based manual classification, it is believed that the classification correctness rate in MDC operation is about 80%. When Purity of ADC results in a category is at least 80%, it can therefore be said that no MDC operation is required for the category. That is, Purity can be used as a criterion for judging whether or not visual verification in MDC operation is required.

FIG. 4(C) shows an example of a confusion matrix in which the number of classification categories is increased to three. FIG. 4(C) is also a schematic view showing an actual GUI displayed on the display section 206, and the GUI displays judgment information used to judge which classification is used, ADC or MDC, as well as a confusion matrix 401.

To calculate Purity and Accuracy associated with each category in a confusion matrix in which the number of classification categories is increased to three or greater, the calculation may be performed by assuming that ADC results in a category of interest or MDC results corresponding to a classification result of interest other than those classified as true positive are all false negative or false positive.

For example, in FIG. 4(C), Purity associated with the ADC results "A" is calculated as follows: The number of true positive in the ADC results "A" is divided by the sum of the number of true positive and the number of false positive in the ADC results "A"=55/(55+5+0)×100=92%, and Accuracy associated with the category A is calculated as follows: The number of true positive in the category A is divided by the sum of the number of true positive and the number of false negative in the category A=55/(55+2+3)×100=92%. Purities associated with the other ADC results "B" and "C" or Accuracies associated with the other categories B and C can be calculated in the same manner.

The confusion matrix shown in FIG. 4(C) is produced by the ADC controller 202 that reads classification information stored in the classification information storage unit 205. As described above, the classification information storage unit 205 stores ADC result data along with MDC result data with both the data related to common defect IDs, and the ADC controller 202 reads the ADC result data and the MDC result data while referring to the defect IDs and counts defects in each category to produce a confusion matrix. Purity and Accuracy are also calculated by the ADC controller 202 as follows: The ADC controller 202 classifies the numerals in the confusion matrix as true positive and false negative or true positive and false positive for each category of interest and, based on the defect count for each of the classification categories, computes the expression of the number of true positive divided by the sum of the number of true positive and the number of false positive or the number of true positive divided by the sum of the number of true positive and the number of false negative described above.

Judgment information used to judge which classification, ADC or MDC, is performed can be a message 402 showing a category that requires MDC, an enhancing display mark 403 that indicates Purity that requires no MDC, and an enhancing display mark 404 that indicates a category that requires no MDC. To enhance displayed information, for example, an appropriate object is superimposed on a confusion matrix, for example, a numeral is encircled as shown in FIG. 4(C); a numeral or a background corresponding to Purity or a category is highlighted; or the color thereof is changed. In the example shown in FIG. 4(C), the message 402 indicates a category that requires MDC, and the enhancing display marks 403 or 404 indicate numerals or categories that require no MDC. Alternatively, a message may indicate a category that requires no MDC, or an enhancing display mark may indicate a numeral or a category that requires MDC.

In the example shown in FIG. 4(C), the enhancing display mark 403 or 404 indicates a category or a numeral that satisfies a criterion of Purity being at least 80%, that is, a category or a numeral that requires no MDC. The criterion of 80% is an initial value provided by the ADC processor 118, and the initial value can be changed. To this end, the ADC controller 202 displays a judgment criterion setting box 405 on the GUI, which allows the user of the apparatus to input an arbitrary numeral. The ADC controller 202 reads the numeral inputted through the GUI and, based on the numeral, changes the message displayed on the GUI and items (category and numeral) displayed in the enhanced form in the confusion matrix.

A description will next be made of a method for optimizing a threshold used in defect classification by using a confusion matrix. For example, when defect classification is performed by using a classification model having a binary tree structure, each of the trees that form the binary tree undergoes classification based on whether or not a characteristic value of a defect exceeds a threshold. To allow the user of the apparatus to perform defect classification with desired precision, the threshold needs to be optimized. A method for optimizing the threshold will be described below, and the threshold, which is a value set as a parameter, is called a "parameter" in the following description.

Figure 3:
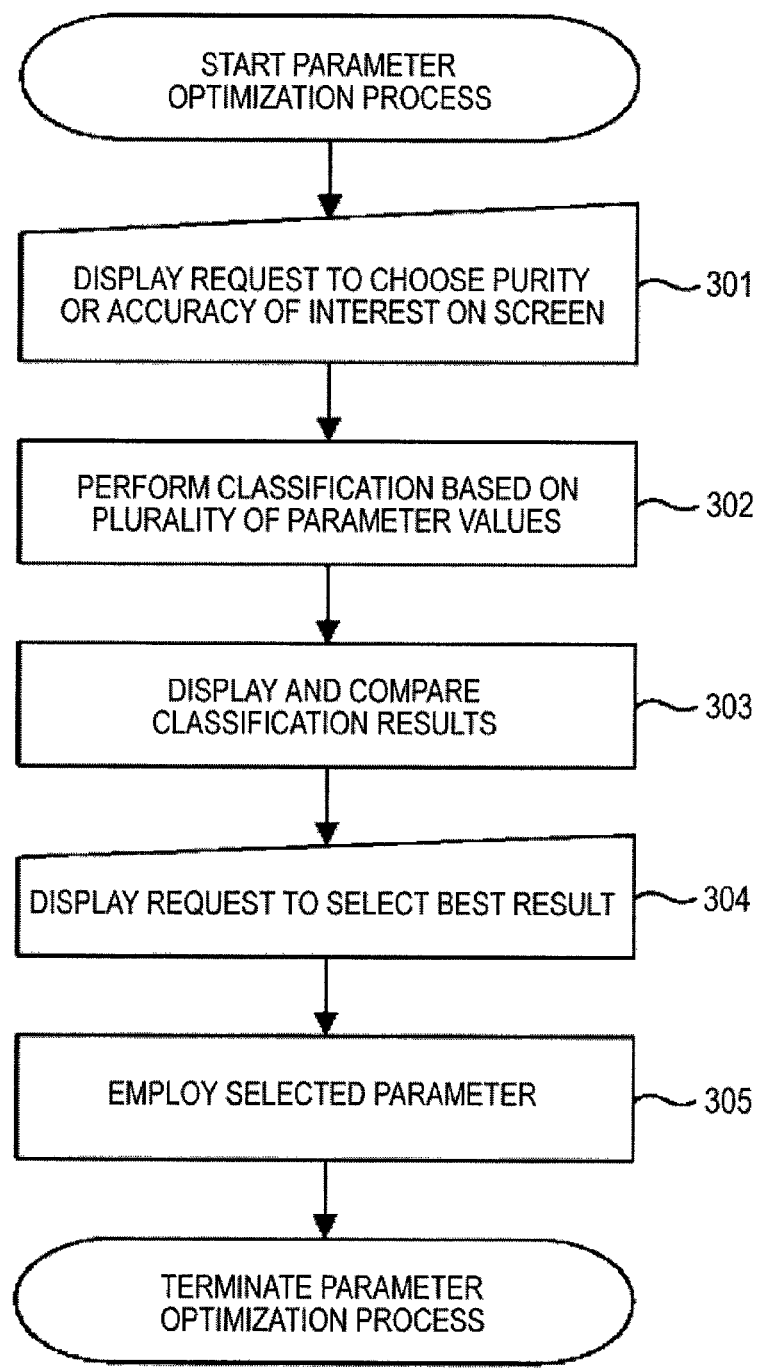
FIG. 3 is a flowchart showing a procedure of optimizing a classification parameter.

FIG. 3 is a flowchart showing a procedure of optimizing a classification parameter. When classification parameter optimization starts, a request to choose Purity or Accuracy of interest is displayed on the display section 206 (step 301). The user of the apparatus inputs Purity or Accuracy of interest onto the GUI in response to the choice request. Classification is then performed based on a combination of a plurality of classification parameter values (step 302). The classification is performed by the ADC processor 118, as described with reference to FIG. 2. After the classification is performed, classification results are displayed on the display section 206 (step 303). To display and compare the classification results obtained in correspondence with the plurality of classification parameter values with each other, confusion matrices are displayed in tandem in correspondence with the plurality of classification parameter values for ease of evaluation result observation. In this process, a button for selecting any of the classification parameter values is displayed on the GUI where the displayed results are displayed. The user selects the best result from the classification results obtained by performing the classification based on the plurality of classification parameter values (step 304). The ADC controller 202 determines a parameter to be employed based on the inputted result (step 305). The procedure described above allows the user to focus on the correctness rate in a specific category and determine a parameter that is optimum to improve the classification performance in the category of interest.

Figure 5:
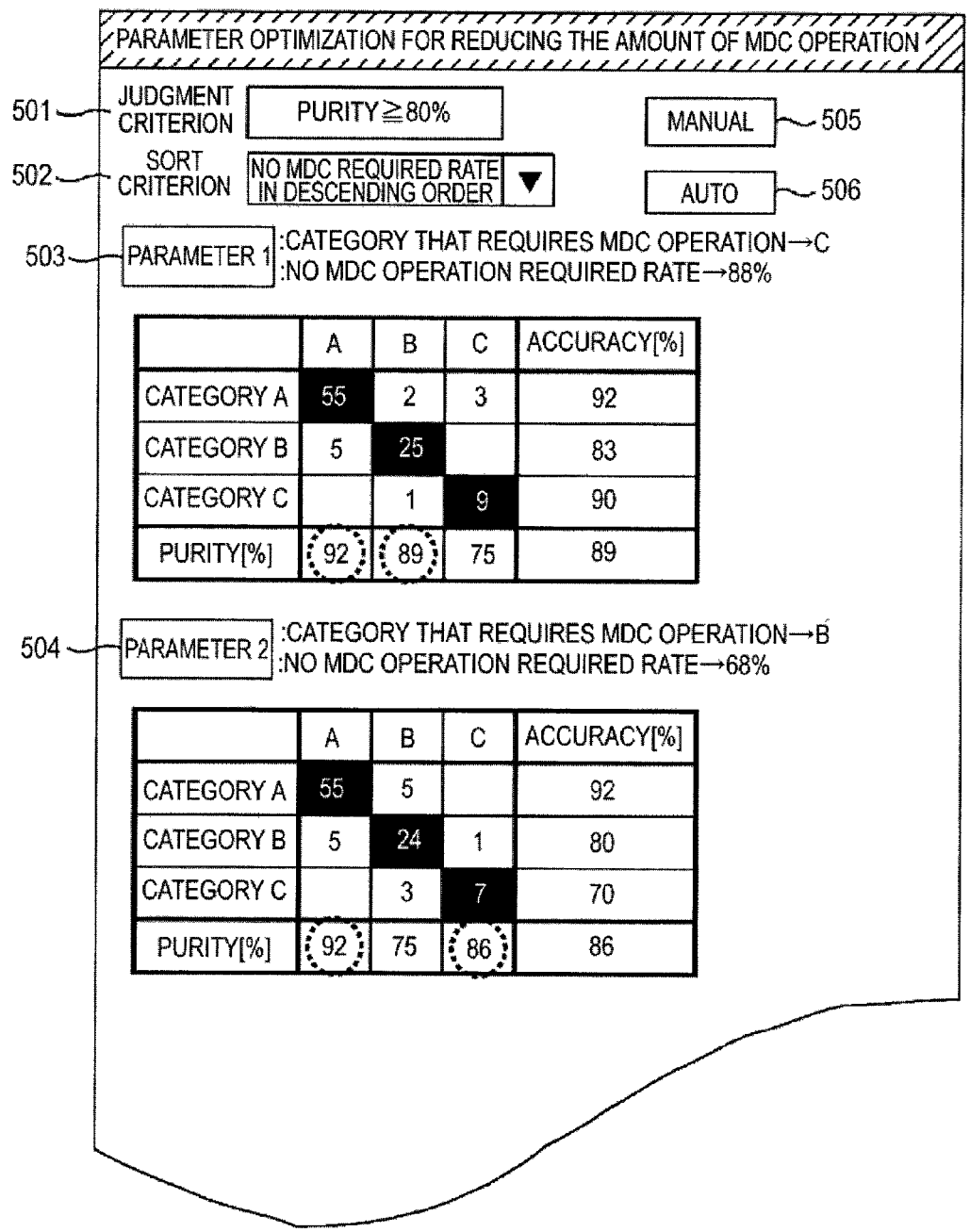
FIG. 5 shows a setting/evaluation screen for parameter optimization for reducing the amount of MDC operation.

FIG. 5 shows an example of the GUI for optimizing the parameter in order to reduce the amount of MDC operation by checking evaluation results obtained by performing the classification based on a plurality of parameter values. In FIG. 5, confusion matrices produced in correspondence with the plurality of parameter values are displayed in correspondence with the parameter values. On the GUI shown in FIG. 5 are displayed a judgment criterion setting box 501 for setting a judgment criterion according to which it is judged that no MDC operation is required; a sort criterion setting box 502 for sorting the confusion matrices in a user's desired order and displaying the sorted confusion matrices; parameter input boxes 503 and 504; a manual parameter setting switching button 505, and an automatic parameter setting switching button 506. Further, a "no MDC operation required rate" displayed in FIG. 5 is a numeral obtained by dividing the number of defects (or the number of defect images) classified into a category having been judged that no MDC is required by the total number of defects (or the total number of defect images). The "no MDC operation required rate" is calculated by the ADC controller 202. The "no MDC operation required rate" can be replaced with an "MDC operation required rate," which is defined as a number obtained by dividing the number of defects (or the number of defect images) classified into a category having been judged that MDC is required by the total number of defects (or the total number of defect images).

In FIG. 5, the judgment criterion according to which it is judged that no MDC operation is required is so set that purity≥80%, and evaluation results are sorted and displayed in decreasing order of the number of defects having been judged that no MDC operation is required, that is, in descending order of Purity.

In the present example, when a parameter 1 is employed, categories A and B require no MDC operation because ADC results in the two categories are reliable, and only a category C requires verification in MDC operation. When a parameter 2 is employed, the categories A and C require no MDC operation, and only the category B need to be checked in MDC operation. The number of categories that require MDC operation is the same for the parameters 1 and 2, but the number of defects in the category B is greater than that in the category C, which means that the no MDC operation required rate is higher for the parameter 1 than for the parameter 2. That is, since the number of defects that require visual verification is greater for the parameter 2 than for the parameter 1, the parameter 1 is more suitable than the parameter 2 for the purpose of reducing the amount of MDC operation.

Figure 6:
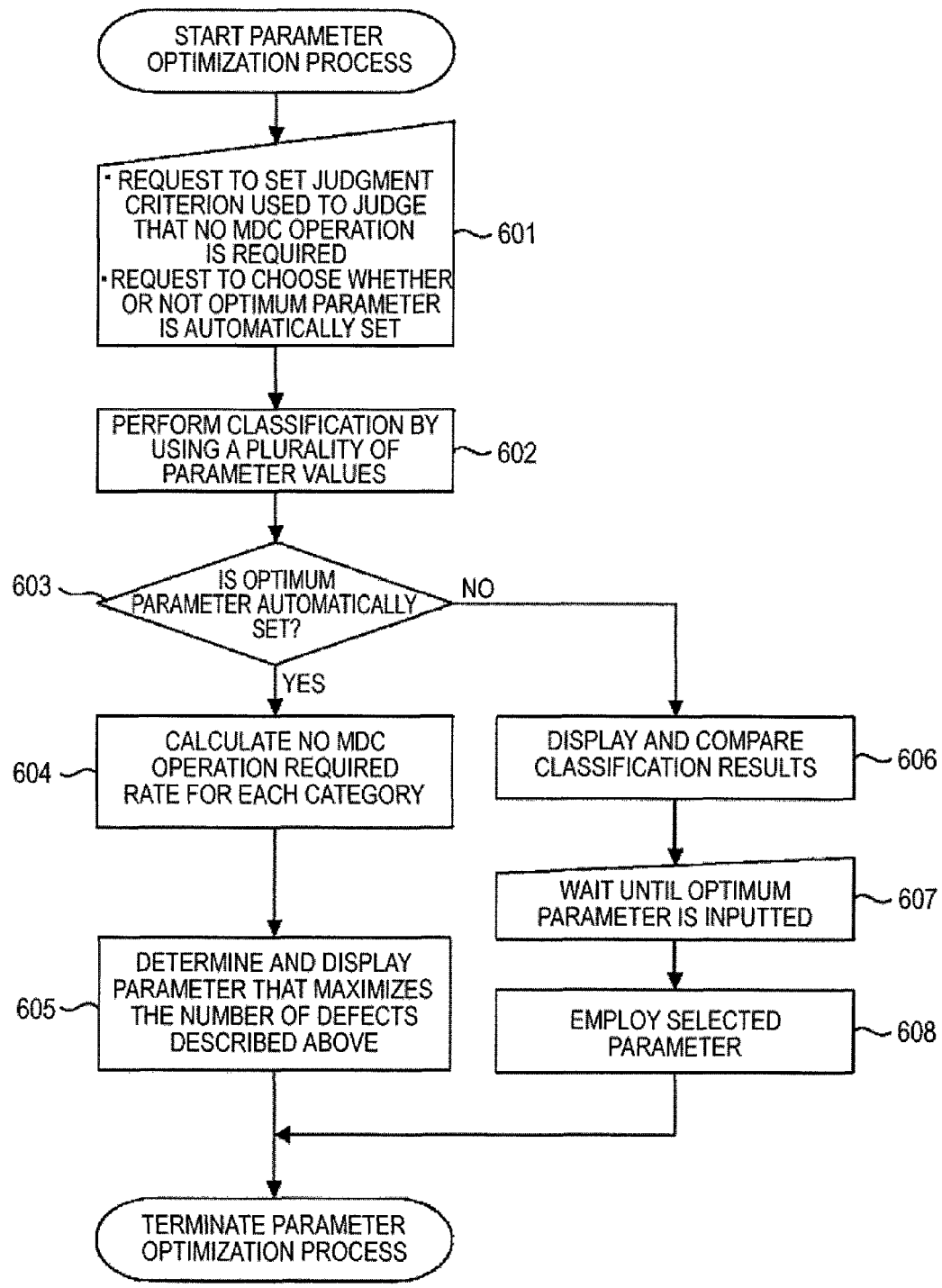
FIG. 6 is a flowchart showing a procedure of parameter optimization for the purpose of reducing the amount of MDC operation.

FIG. 6 is a flowchart of classification parameter optimization for the purpose of reducing the amount of MDC operation. The ADC controller 202 first displays on the GUI a request to set a judgment criterion according to which it is judged that no MDC operation is required (judgment criterion setting box 501, for example) and a request to choose whether an optimum parameter is set automatically by the apparatus or manually (step 601). The setting requests are made, for example, by displaying an input box, a setting button, or any other suitable component for setting the items described above on the GUI. The user of the apparatus inputs a judgment criterion in accordance with the setting request. In the example shown in FIG. 5, the setting is made as follows: purity≥80%. Classification is then performed by using a plurality of classification parameter values (step 602). The process carried out by the apparatus in step 602 is that described with reference to FIG. 4 or FIG. 5. The process bifurcates as shown in step 603 depending on whether an optimum parameter is automatically set or manually selected and set. When an optimum parameter is automatically set, the ADC controller 202 calculates the no MDC operation required rate (step 604), and a classification parameter that maximizes the number of defects that belong to a category that requires no MDC operation is employed. A parameter having been eventually employed is displayed on the GUI (step 605). When an optimum parameter is manually selected and set, results obtained by performing classification by using a plurality of parameter values are displayed on the GUI and compared to each other (step 606) as shown in FIG. 5, and the apparatus waits until an optimum parameter is inputted (step 607). The user inputs the best result through the GUI shown in FIG. 5, and the ADC controller 202 employs the input result as the optimum parameter (step 608).

Manual selection and setting is required when a classification parameter that maximizes the no MDC operation required rate is not necessarily employed as the optimum parameter. In this case, it is necessary to select and set an optimum parameter in consideration of another judgment criterion. For example, the degree of importance of each classification category may be additionally considered, or classification parameter setting for the purpose of reducing missed defects, which will be described later, may be additionally considered in the judgment process. When a parameter can be manually selected and set, a parameter that provides classification results more suitable for a user's need can be set. In this process, the best result is readily selected by displaying confusion matrices, the criterion according to which it is judged that no MDC operation is required, the name of a category that requires no MDC operation or requires MDC operation, the no MDC operation required rate, and other factors in tandem, as shown in FIG. 5. The procedure described above allows a classification parameter that is optimum to reduce the amount of MDC operation to be automatically or manually set.

In the present embodiment, on the screen that displays an optimum parameter are concurrently displayed confusion matrices. The concurrent display is intended only for ease of operation of the user of the apparatus, and what is essentially important is that judgment information representing which category requires (or does not require) MDC is displayed on the screen. No confusion matrix may therefore be displayed, unlike in FIG. 5, but calculated Purity, information on a category that requires or does not require MDC, or a message showing a category that requires (or does not require) MDC may only be displayed.

Second Embodiment

In the present embodiment, a description will be made of a method for optimizing a boundary value (parameter) used in an algorithm in which a boundary line is set between categories in a characteristic value space and classification is performed based on the boundary line. The description is simplified by limiting the method to be used not only in a two-dimensional space but also with an algorithm having a binary tree structure. It is, however, noted that the algorithm is not limited to an algorithm having a binary tree structure and the method is also applicable to boundary setting in a multi-dimensional space.

A SEM-based defect observation apparatus is assumed as an apparatus to which the optimization method according to the present embodiment is applied. The hardware configuration of the apparatus is the same as that in the first embodiment, and no description of the hardware configuration will therefore be made.

Figure 7:
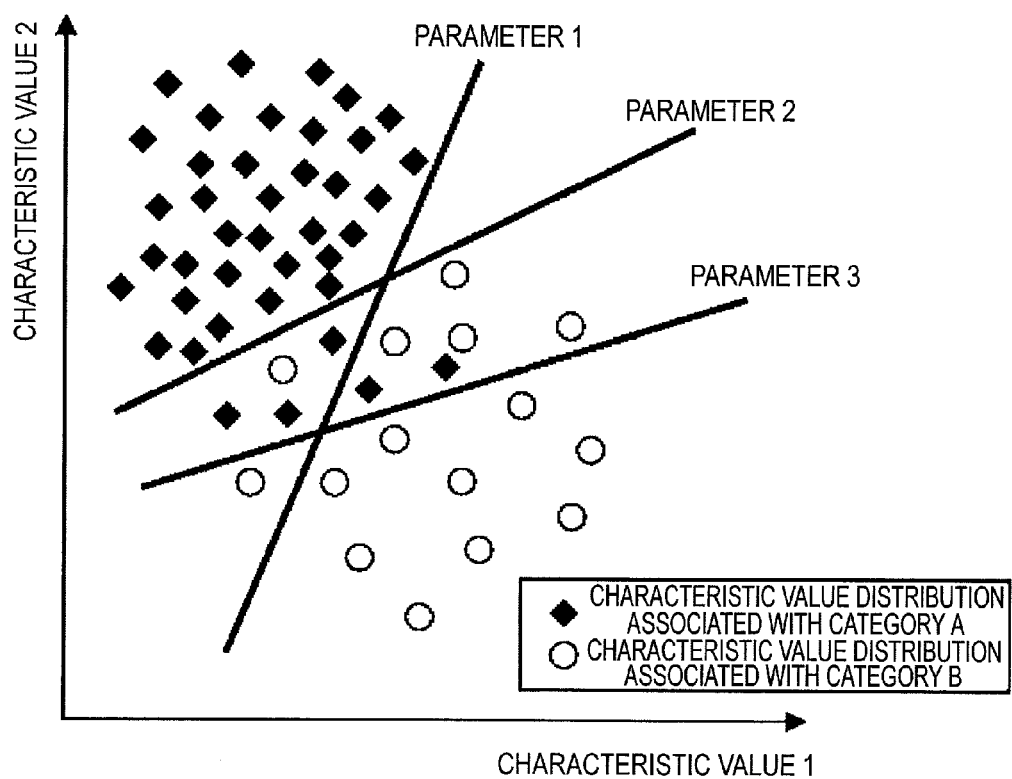
FIG. 7 is a conceptual diagram for describing the concept of parameter optimization in a classification algorithm in which boundary setting in a characteristic value space is the parameter.

FIG. 7 shows a characteristic value distribution diagram for describing the parameter optimization method in the algorithm used in the present embodiment. In FIG. 7, a boundary line is the parameter. In practice, the number of characteristic values ranges from several tens to several hundreds in many cases, and the characteristic values are expressed in a multi-dimensional space. In the following description, the horizontal axis represents a characteristic value 1, and the vertical axis represents a characteristic value 2, that is, two characteristic values in total for ease of description. Further, ♦ represents the characteristic value distribution associated with a category A, ○ represents the characteristic value distribution associated with a category B, and parameters 1, 2, and 3 represent three types of boundary lines.

Consider now the optimization method in a case where the classification parameter is optimized for the purpose of reducing the amount of MDC operation. When a boundary line corresponding to the initial parameter 1 is set, the category A contains two erroneously classified defects and the category B contains two erroneously classified defects. If the category A, in which defects frequently occur, can be so configured that no MDC operation is required, the amount of overall operation is greatly reduced. In view of the fact described above, the present embodiment focuses on the category A and aims to improve Purity associated with the category A.

To improve Purity associated with the category A, defects that belong to the category B need only not be classified into a group of defects having been classified by ADC as the category A. The parameter 2 is therefore believed to be preferable.

Figure 8:
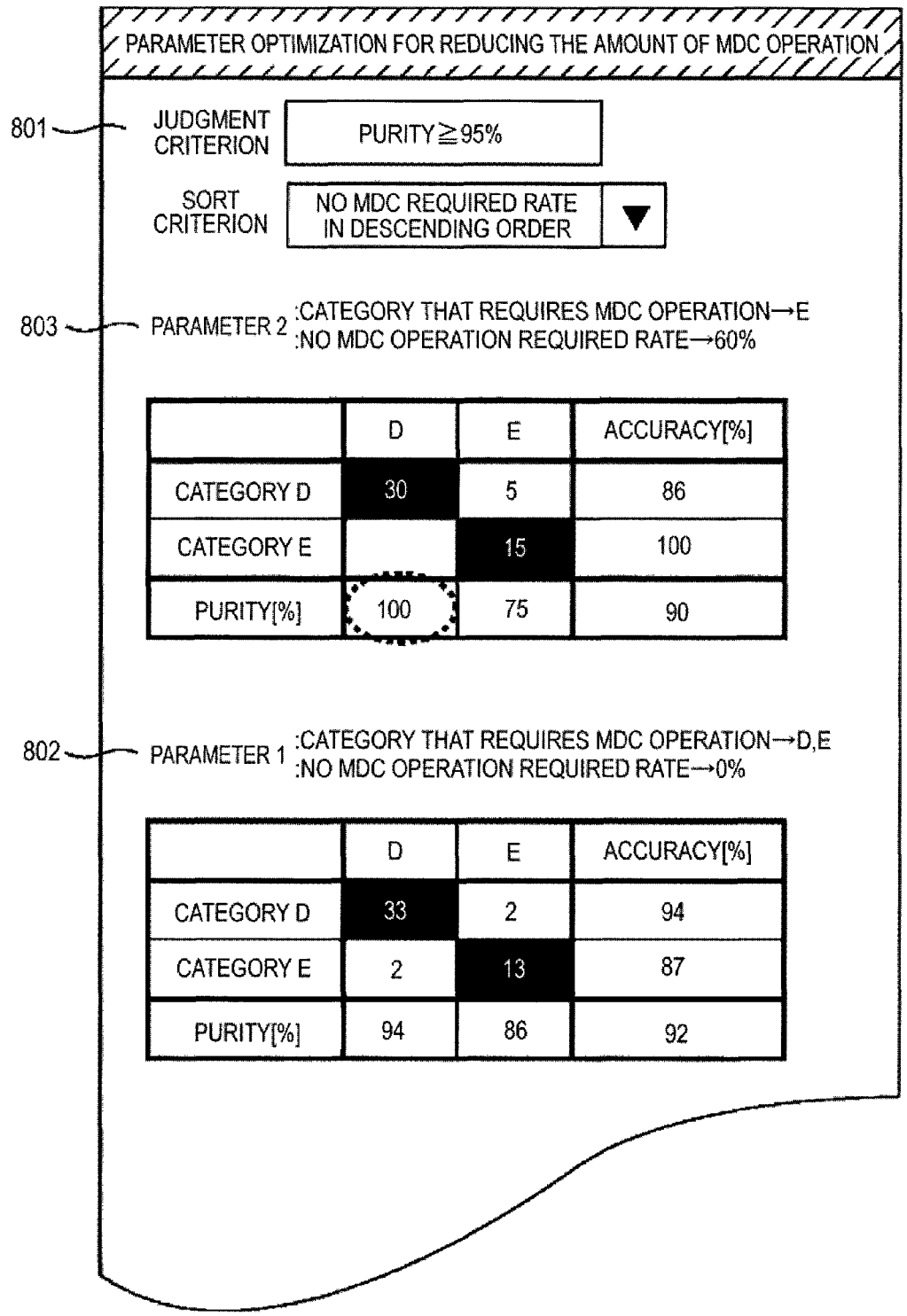
FIG. 8 shows a setting/evaluation screen for describing the concept of parameter optimization in the classification algorithm in which boundary setting in a characteristic value space is the parameter.

FIG. 8 shows comparison between classification results obtained when the parameter 1 is employed and classification results obtained when the parameter 2 is employed in the example shown in FIG. 7. Although the judgment criterion according to which it is judged that no MDC operation is required is typically set at about 80% in many cases, the judgment criterion shown in a judgment criterion setting box 801 is set at a stricter value as follows: purity≥95%, because the number of categories is small.

Based on the criterion described above, categories D and E do not satisfy purity≥95% when the boundary line corresponding to the parameter 1 is employed, as shown in a result 802. In this case, MDC operation is required and the no MDC operation required rate is 0%. Instead of no MDC operation required rate, an MDC operation required rate may alternatively be calculated and displayed, as in the first embodiment.

On the other hand, in the case of the parameter 2, the user of the apparatus focuses on the category D, in which defects frequently occur, and aims to improve Purity associated with the category D in order to configure the category D to require no MDC operation, and it is judged that the category D requires no MDC operation as expected. As a result, the no MDC operation required rate is greatly improved to 60%, which indicates that introduction of ADC can reduce the amount of manpower-based MDC operation by 60%.

As described above, when the parameter 1 is employed in FIG. 7, the overall correctness rate (calculated by (a+d)/(a+b+c+d) in FIG. 4) decreases from 92% to 90% as compared with the case where the parameter 2 is employed, but when the user focuses on Purity associated with the category A (category D in FIG. 8) and employs the parameter 2 for the purpose of reducing the amount of MDC operation, the no MDC operation required rate is dramatically improved from 0% to 60%.

Third Embodiment

In the present embodiment, a description will be made of a weight optimization method in a case where an algorithm according of which classification performance is improved by changing the weight of each characteristic value is employed. In the present embodiment, the weight corresponds to the parameter. In FIG. 9, the number of characteristic values is limited to two to simplify the description, but the algorithm is also applicable not only to a multi-dimensional space but also to a method for calculating the distance between a characteristic value distribution of taught data and data to be classified in a multi-dimensional space or a method for quantifying a value corresponding to the distance in the characteristic value space in another calculation method, such as fuzzy voting.

A SEM-based defect observation apparatus is assumed as an apparatus to which the optimization method according to the present embodiment is applied, as in the second embodiment. The hardware configuration of the apparatus is the same as that in the first embodiment, and no description of the hardware configuration will therefore be made.

FIGS. 9(A) and 9(B) are characteristic value histograms for describing the concept of the parameter optimization in the algorithm employed in the present embodiment. FIGS. 9(A) and 9(B) schematically show three types of categories F, G, and H and two characteristic values 3 and 4 extracted for the description.

The characteristic value histograms show the characteristic value distribution of taught data. In FIG. 9(A), for example, the horizontal axis represents the characteristic value 3, and the vertical axis represents defect occurrence frequency. FIG. 9(A) shows that data taught as the category F tend to contain characteristic values smaller than those in categories G and H, and that defects under classification are likely to be classified into the category F when the characteristic value of data to be classified is small. The characteristic value distributions are created by the ADC processor 118 shown in FIG. 1 or the ADC controller shown in FIG. 2. For example, the image processor 203 performs image processing operation on images saved in the image information storage unit to calculate the characteristic values, and the classification processor 204 converts the calculated characteristic values into those in a form suitable for classification. The display unit 206 then displays the converted characteristic values. The results are preferably so saved in the classification information storage unit 205 that they are readily reused.

In the algorithm that improves classification performance by changing the weight to a characteristic value, the classification performance is improved by increasing the weight to a characteristic value that seems to be highly effective in the performance improvement whereas lowering the weight to a characteristic value that seems not to be very effective in or harmful to the performance improvement. Consider also in the present embodiment a case where the classification parameter is optimized for the purpose of reducing the amount of MDC operation. For example, it is assumed that the amount of operation is greatly reduced if defects frequently occur in the category F and the category F can be configured to require no MDC operation. In this case, the user focuses on the category F and aims to improve Purity associated with the category F.

To improve Purity associated with the category F, the weight to a characteristic value so distributed that the characteristic value histogram of the category F does not overlap with those of the other categories G and H may be increased, whereas the weight to a characteristic value so distributed that the characteristic value histogram of the category F overlaps with those of the other categories G and H may be lowered. In the present example, the weight to the characteristic value 3 shown in FIG. 9(A) is increased, whereas the weight to the characteristic value 4 shown in FIG. 9(B) is lowered.

The weight parameter to a characteristic value can be automatically set. For example, an initial value of the weight parameter is set at a value obtained by equally dividing one by the number of characteristic values, and the initial value is changed to different values. In this process, a parameter that maximizes Purity associated with a category of interest is employed as an optimum value. As will be described later, when it is intended to prevent defects in a category of interest from being missed, the weight parameter can be optimized by focusing on Accuracy instead of Purity. Further, the weight parameter is not necessarily set automatically but can be set manually. For example, when empirical findings are available, an optimum solution can be obtained quickly and efficiently by setting an initial value, an incremental width, and the upper and lower limits of the parameter. When the weight parameter is manually set as described above, for example, the keyboard 207 and the mouse 208 are used to set the initial value, the incremental width, and the upper and lower limits of the parameter through the GUI displayed on the display section 206 shown in FIG. 2, and based on the thus set values, the image processor 203 uses data saved in the image information storage unit 201 to calculate characteristic values or reads characteristic values saved in the classification information storage unit. The classification processor 204 then optimizes the weight parameter, which is displayed on the display section 206.

To estimate how much the amount of MDC operation can be eventually reduced, it is necessary to calculate the no MDC operation required rate with the categories G and H included. The parameter is therefore preferably determined by using a plurality of parameter values, that is, weighting a characteristic value in different ways, and displaying and comparing the results, as shown in FIGS. 5 and 8.

According to the present method, Purity, Accuracy, or the overall correctness rate associated with a category of interest can be improved in a system in which classification performance is improved by optimizing the weight to a characteristic value. In particular, the present method is effective in a system that employs a learning classification algorithm.

Fourth Embodiment

In the present embodiment, a description will be made of a system that classifies defects to be classified in multiple stages and an example of a method for optimizing connection between the stages. In the present embodiment, connection between the stages is the parameter. Classification algorithms used in the stages do not necessarily differ from each other, but a single classification algorithm, for example, according to which defects to be classified are identified and narrowed in multiple stages can be used. Further, a SEM-based defect observation apparatus is assumed as an apparatus to which the optimization method according to the present embodiment is applied, as in the second and third embodiments. The hardware configuration of the apparatus is the same as that in the first embodiment, and no description of the hardware configuration will therefore be made.

FIG. 10(A) is a schematic view of category links for describing the parameter optimization method in a case where an algorithm for improving classification performance by classifying defects in multiple stages is employed. Instead of directly classifying defects into three categories I, J, and K, intermediate classes $\alpha$, $\beta$, and $\gamma$ are introduced in an n-th stage, as will be described in the present embodiment. In this case, defects only need to be classified in the (n+1)-th stage into two classes, the categories I and J, the categories J and K, and the categories K and I. As a result, the degree of difficulty in classification is successfully reduced. In a multi-stage classification algorithm of this type, consider a case where a classification parameter is optimized for the purpose of reducing the amount of MDC operation. In the present embodiment, the category link between the n-th stage and (n+1)-th stage corresponds to the classification parameter. For example, it is assumed that the amount of operation can be greatly reduced if defects frequently occur in the category I and Purity associated with the category I can be configured to require no MDC operation. In this case, the user focuses on the category I and aims to improve Purity associated with the category I. To improve Purity associated with the category I, the number of defects erroneously classified into the category I instead of being classified into a correct category may be reduced. To this end, consider cutting a category link 1001 between the intermediate classification category $\alpha$ and the category I or a category link 1002 between the intermediate classification category $\gamma$ and the category I. For example, when the category link 1001 is cut, however, defects classified into the intermediate class $\alpha$ will all be classified into the category J. It is therefore noted that the number of defects correctly classified into the category I decreases when a large number of defects that belong to the category I are classified into the intermediate class $\alpha$. In view of the fact described above, before a category link is cut, it is, for example, conceivable to additionally consider the frequency at which a defect that belongs to the category I occurs. Alternatively, it is effective to perform classification by using the following parameters and compare and evaluate classification results: a parameter 1 corresponding to a case where no category link is actually cut; a parameter 2 corresponding to a case where the category link 1001 is cut; a parameter 3 corresponding to a case where the category link 1002 is cut; and a parameter 4 corresponding to a case where both the category links 1001 and 1002 are cut. Comparison and evaluation results can be displayed as shown in FIGS. 5 and 8, whereby which parameter allows the amount of MDC operation to be reduced by the greatest amount can be readily identified.

Fifth Embodiment

In the present embodiment, a description will be made of a parameter optimization method for minimizing the number of not-detected or missed defects of interest, that is, in a specific defect category in which the user of the apparatus is particularly interested. In the following description, the defect of interest described above is referred to as a DOI. The overall configuration of the apparatus is the same as that in the first embodiment, and no description of the overall configuration will therefore be made.

As described above, Accuracy is a value calculated by using the number of defects correctly classified by ADC into a category of interest as the numerator and the number of defects classified by MDC into the category as the denominator in a confusion matrix. Since high Accuracy means that a small number of missed defects that must be classified into the correct category, Accuracy can be used as a missed DOI rate evaluation index.

Figure 11:
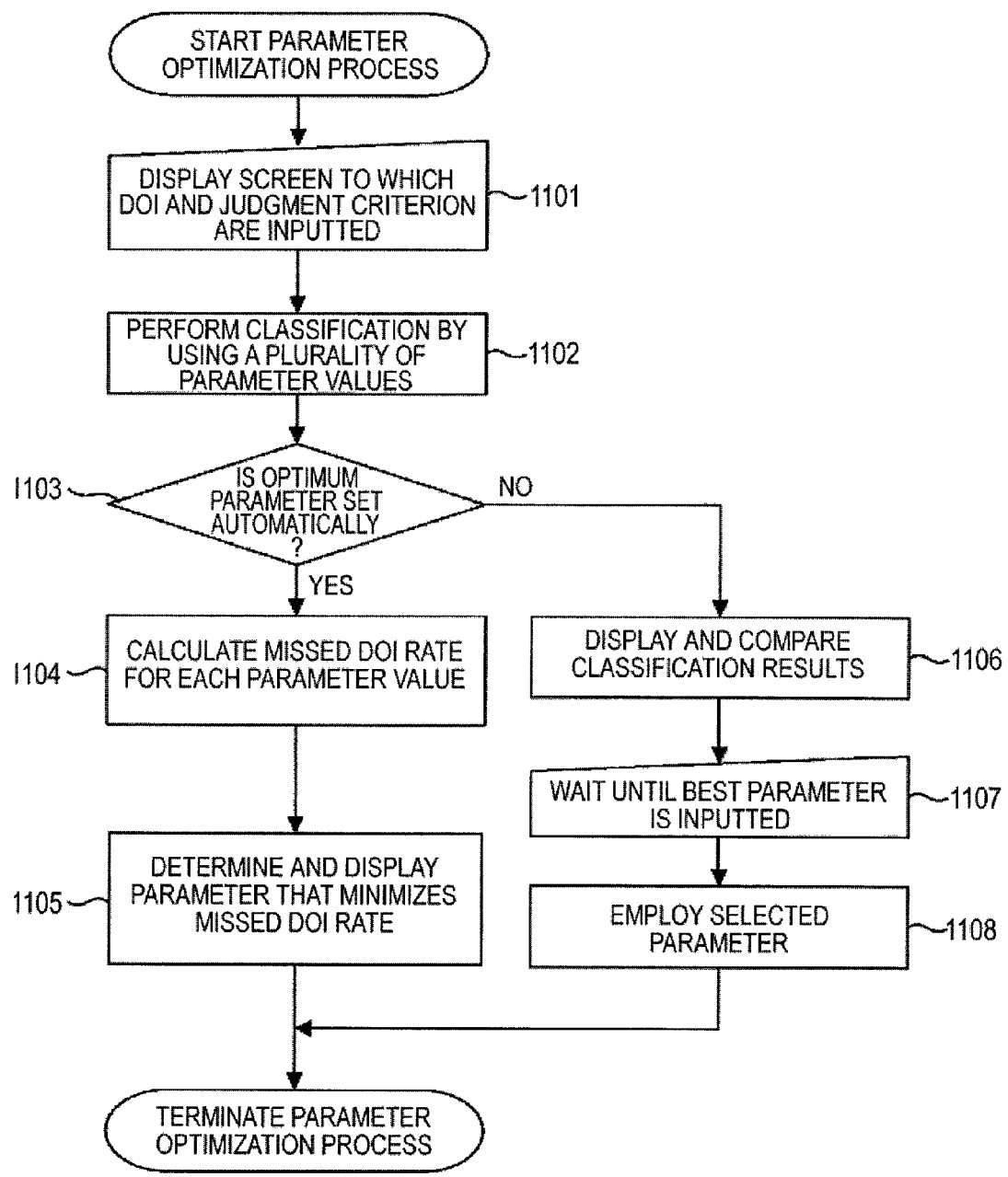
FIG. 11 is a flowchart showing a parameter optimization procedure for reducing the number of missed DOIs.
Figure 12:
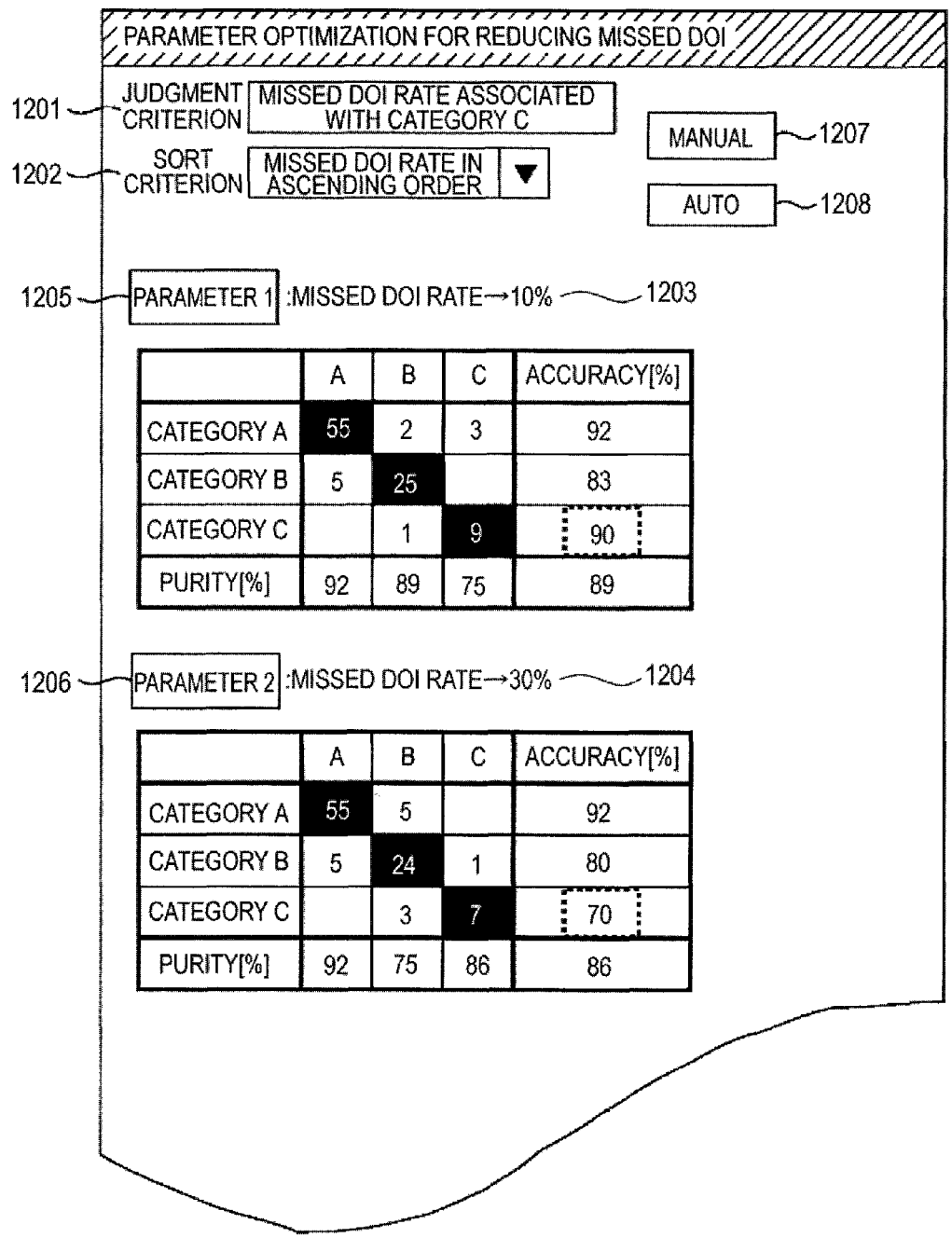
FIG. 12 shows a setting/evaluation screen for parameter optimization for reducing the number of missed DOIs.

FIG. 11 is a flowchart showing a parameter optimization procedure according to the present embodiment, and FIG. 12 is a schematic view showing a GUI screen on which parameter optimization results in the present embodiment are displayed. The GUI screen shown in FIG. 12 is displayed on the display section 206 shown in FIG. 2.

When the procedure starts, on the GUI are displayed in step 1101 a request to set a defect category in which the missed rate is desired to be low (hereinafter referred to as DOI) and a judgment criterion as well as a request to choose whether an optimum parameter is set automatically by the apparatus or manually (step 1101). As the setting and choosing requests, for example, the following items are displayed as shown in FIG. 12: a judgment criterion setting box 1201; a sort criterion setting box 1202; parameter input boxes 1205 and 1206 each for setting an evaluation criterion threshold; a manual parameter selection switching button 1207; and an automatic parameter selection switching button 1208, and the user of the apparatus inputs desired setting values by using the boxes and buttons described above. Examples of the judgment criterion include Accuracy associated with a specific DOI and the number of defects that belong to a category the Accuracy associated with which is higher than reference Accuracy with respect to the DOI.

In the example shown in FIG. 12, a category C is set as the DOI, and the missed DOI rate associated with the category C is employed as the missed DOI judgment criterion 1201. A missed DOI rate evaluation criterion is set as follows: Accuracy≥90%. A plurality of categories can alternatively be set as the DOI. Further, the value set as the judgment criterion can be changed for each of the categories. Changing the judgment criterion for each of the categories allows a defect under classification to be weighted in accordance with the degree of importance of the type of the defect, whereby the DOI can be set more flexibly.

After the DOI and the judgment criterion are inputted, the ADC processor 118 performs classification by using a plurality of classification parameter values having been inputted (step 1102).

After the classification is performed, the process bifurcates as shown in step 1103 depending on whether an optimum parameter is automatically set or manually selected and set. When the manual switching button 1207 has been pressed at the time of start of the procedure, the step 1103 bifurcates to "No", whereas when the automatic switching button 1208 has been pressed, the step 1103 bifurcates to "Yes."

When an optimum parameter is automatically set, the ADC controller 202 calculates the missed DOI rate based on each of the inputted parameter values (step 1104), determines a parameter that minimizes the missed DOI rate, and displays the calculated result on the GUI.

When an optimum parameter is manually selected and set, the ADC controller 202 displays results obtained by performing classification based on the plurality of parameter values on the GUI (step 1106) and waits until a parameter value is inputted (step 1107). The user clicks, for example, the parameter selection button 1205 or 1206 shown in FIG. 12 to select the best result. An input box into which a parameter itself is inputted in the form of text may be displayed instead of the parameter selection buttons. After the best parameter is selected, the ADC controller 202 employs the selected parameter (step 1108).

The GUI shown in FIG. 12 corresponds to the display screen after step 1105 or 1106 is executed. Results calculated in correspondence with the plurality of parameter values are displayed in tandem in the form of confusion matrix, and messages 1203 and 1204 showing the missed DOI rate are displayed on a category basis. The confusion matrices for the plurality of parameter values can be sorted and displayed in accordance with an arbitrary parameter. In the present embodiment, matrices are arranged in ascending order of the missed DOI rate as the sort criterion. The missed DOI rate is 10% when the parameter 1 is used and 30% when the parameter 2 is used, which shows that the parameter 1 is preferably used when it is desired to lower the missed rate associated with the category C.

When an optimum parameter is manually selected and set, a classification parameter that minimizes the missed DOI rate is not necessarily employed, but an optimum parameter can be selected and set in consideration of an additional judgment criterion. In this process, when the confusion matrices, the judgment criterion, the DOI category name, the missed DOI rate, and other factors are displayed in tandem as shown in FIG. 12, the best result can be readily selected. An optimum classification parameter that lowers the number of missed DOIs can be set automatically or manually by carrying out the procedure described above.

The parameter adjustment method may differ in some cases between a case where it is intended to lower missed DOI rate and a case where it is intended to reduce the amount of MDC operation. For example, in an algorithm according to which classification is performed by setting a boundary line in a characteristic value space as shown in FIG. 7, and when it is intended to reduce the amount of MDC operation, it is expected that parameter optimization is performed in the order of the parameter 3, the parameter 1, and the parameter 2 because improving Purity associated with the category A in which defects occur frequently is effective in reducing the amount of MDC operation. When the category A is the DOI and it is intended to reduce the number of missed DOIs, however, it is expected that parameter optimization is performed in the order of the parameter 2, the parameter 1, and the parameter 3 because improving Accuracy associated with the category A is effective in reducing the number of missed DOIs. As a result, when a plurality of parameters are compared and evaluated, it is preferable to efficiently extract a parameter that matches an optimization criterion, whereby the efficiency of the comparison can be improved.

Figure 10:
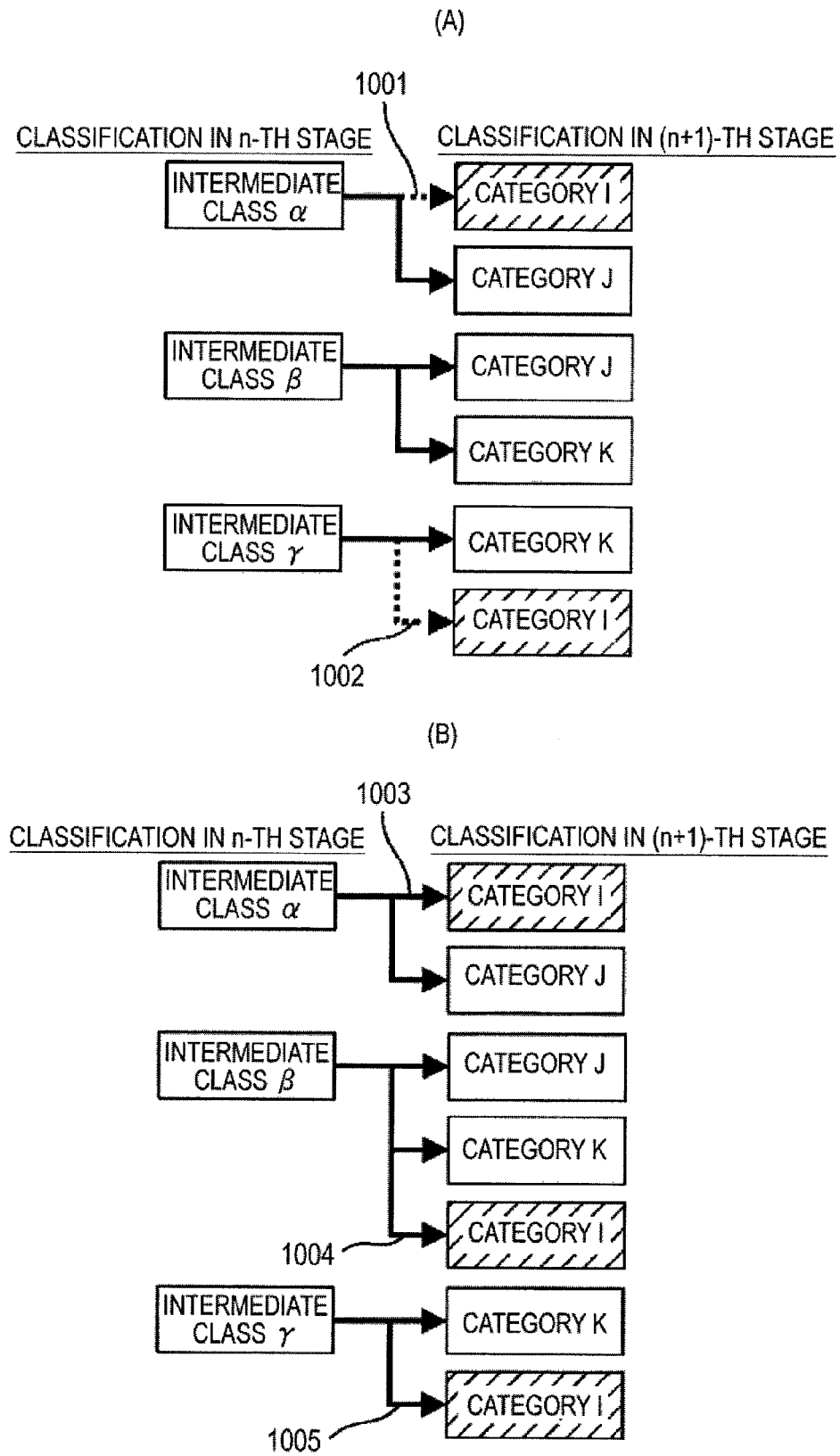
FIG. 10 is a conceptual diagram for describing the concept of parameter optimization in a multi-stage classification algorithm.

Similarly, in the case of category link optimization in the algorithm shown in FIG. 10 according to which classification is performed in multiple stages, and when it is intended to reduce the amount of MDC operation, it is conceivable to cut any of the category links to the category I as shown in FIG. 10(A) because improving Purity associated with the category I, in which defects occur frequently, is effective in reducing the amount of MDC operation. When it is intended to lower the number of missed DOIs, and the category I is the DOI, however, it is conceivable that a category link 1003 or 1005 to the category I is not cut but both are left and that a category link 1004 between the intermediate class β and the category I is added as shown in FIG. 10(B) because improving Accuracy associated with the category I is effective in reducing the number of missed DOIs.

As described above, since lowering the number of missed DOIs minimizes the number of defect images missed due to erroneous classification of observed images that must be classified into a correct DOI category, omission of measures taken against a problematic step due to missed DOIs is prevented.

Sixth Embodiment

Figure 13:
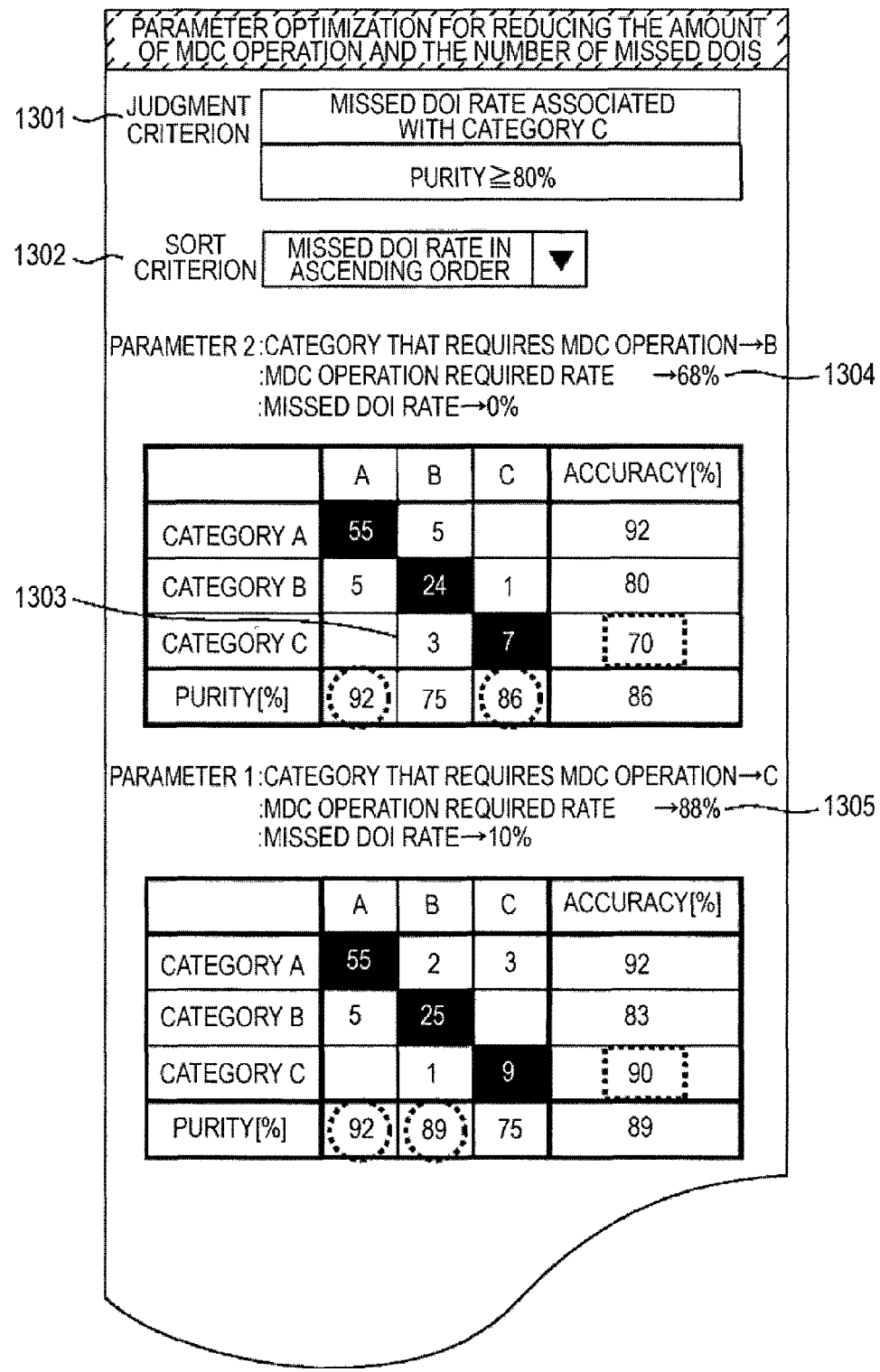
FIG. 13 shows a setting/evaluation screen for parameter optimization for reducing the amount of MDC operation and the number of missed DOIs.

FIG. 13 shows an example of the GUI showing results obtained by optimizing a classification parameter based on two judgment criteria: decrease in the amount of MDC operation and decrease in the number of missed DOIs. In the example, a category C is selected as the DOI and the missed rate associated with the category C is set as one of the judgment criteria 1301. Further, for the purpose of lowering the amount of MDC operation, the other one of the criteria 1301, according to which it is judged that no MDC operation is required, is set as follows: purity≥80%. Confusion matrices are displayed in accordance with a sort criterion 1302, that is, in descending order of the missed DOI rate, whereby the parameter displayed at the highest level can be judged as an optimum parameter. In this example, the missed DOI rate is defined by using the number of defects that must be classified into the category set as the DOI, that is, the number of defects classified by MDC into the category C as the denominator and using the number of defect images erroneously classified into categories in which no MDC operation is performed for verification, that is, the number of defects classified by ADC into categories which are not the category C but Purity associated of which is at least the preset threshold as the numerator. In this case, when the parameter 2 is used, the missed DOI rate is calculated as follows: (the number of defects classified by ADC into the category A instead of the correct category C)/(the number of defects classified by MDC into the category C)=0/7=0% (the number of defect images 1303 erroneously classified into the category B, in which MDC operation is performed for verification, is not counted as missed DOIs), which is better than the missed DOI rate of 10% obtained when the parameter 1 is used. According to the present embodiment, the judgment of whether or not a classification parameter brings a good result based on the complex judgment criteria described above can be readily made.

Seventh Embodiment

In the present embodiment, a description will be made of the configuration of a SEM-based defect observation apparatus having a function of selecting on a defect map a defect used in MDC performed in advance to produce a confusion matrix.

Figure 14:
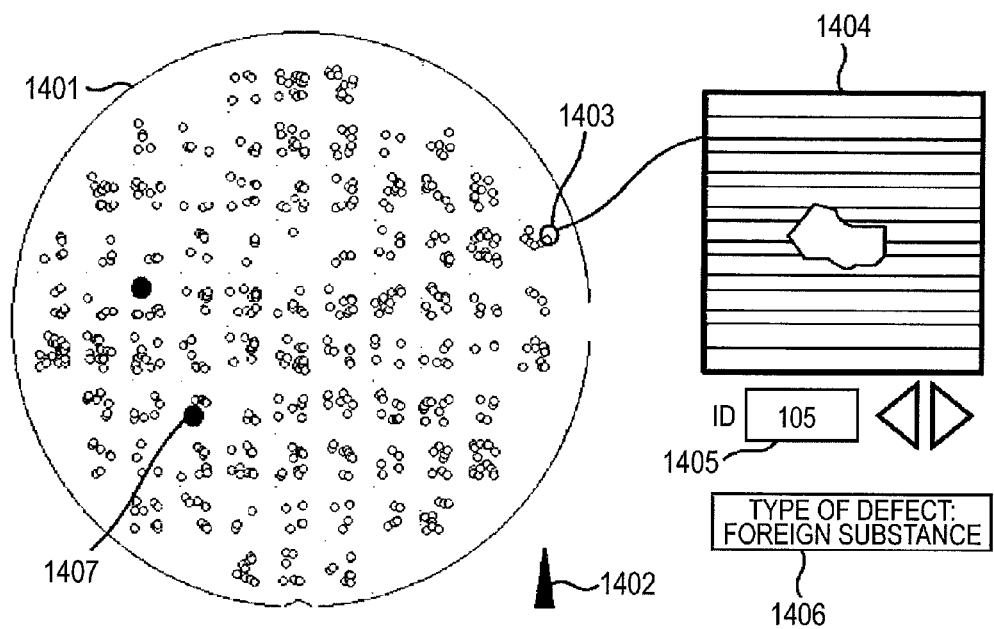
FIG. 14 shows an example of the configuration of a GUI screen for selecting a defect used in MDC.

FIG. 14 shows an example of the GUI screen for selecting a defect on which MDC is performed.

A defect map 1401 is displayed in a left portion of the screen, and the user of the apparatus uses the mouse or any other pointing device to operate a pointer 1402 displayed on the GUI to select an arbitrary defect on the defect map. The thus selected defect is displayed in an active manner on the GUI as labeled by 1403, and a high-magnification image of the selected defect is further displayed in the form of thumbnail in the right portion of the screen. A defect ID is given to each defect, and a defect ID display field 1405 is also displayed below the thumbnail image 1404.

To perform ADR and then select a defect on which MDC is performed, a personal computer provided in the display section 206 searches the defect in the storage device 116 based on its defect ID and displays the searched defect. On the other hand, to select a defect before ADR is performed, a SEM image is captured via the overall controller. The thumbnail image can be replaced with a patch image acquired by a visual inspection apparatus.

The user of the apparatus inputs information on the type of the defect in a defect type input box 1406 while looking at the displayed thumbnail image 1404. Once the input is accepted, the active display 1403 changes to an inactive display 1407, as indicated by a filled circle shown in FIG. 14. The defect ID and the defect type information corresponding to the defect ID having been inputted are stored in the classification information storage unit 205 and used when a confusion matrix is created.

The MDC execution screen in the present embodiment is not limited to the GUI displayed on the operation unit 115 and may alternatively be displayed on an offline computer (separate from SEM-based defect observation apparatus).

REFERENCE SIGNS LIST

101 Electron gun
102 Lens
103 Deflector
104 Objective lens
105 Sample
106 Stage
107 Electron beam
108 Secondary particle
109 Secondary particle detector
110 Electronic optical system controller
111 A/D converter
112 Stage controller
113 Overall controller
114, 203 Image processor
115 Operation unit
116 Storage device
117 ADR processor
118 ADC processor
119 Optical microscope
201 Image information storage unit
202 ADC controller
204 Classification processor
205 Classification information storage unit
206 Display section
207 Keyboard
208 Mouse
401 Confusion matrix
402 Message showing category that requires MDC
403, 404 Enhanced display
405, 501, 801, 1201 Judgment criterion setting box
502, 1202 Sort criterion setting box
503, 504, 1205, 1206 Parameter input box
505, 1207 Manual switching button
506, 1208 Automatic switching button
802, 803, 1304, 1305 Result
1001, 1002, 1003, 1004, 1005 Category link
1203, 1204 Message showing missed DOI rate
1301 Judgment criterion
1302 Sort criterion
1303 The number of erroneously classified defect images

The invention claimed is:

1. A defect review apparatus having a function of capturing an image of a sample under observation and extracting an area corresponding to each defect from the image as a defect image, the defect review apparatus comprising:
    an electronic optical system that images the sample under observation and outputs the acquired image as an image signal;
    a defect detection processor that extracts the defect image;

an automatic defect classification processor that automatically classifies the defects into a plurality of categories; and screen display means for displaying judgment information used to judge which category among the categories into which the automatic defect classification processor has automatically classified the defects needs to undergo manpower-based manual classification;

wherein:

the automatic defect classification processor contains a plurality of pieces of threshold information based on which the defect classification is performed, and pieces of the judgement information for the plurality of thresholds are calculated based on the automatic defect classification results obtained for the plurality of thresholds.

2. The defect review apparatus according to claim 1, further comprising:

a confusion matrix that displays results of the manual classification of the defects and results of the automatic defect classification of the defects in the form of matrix, where the plurality of categories corresponding to rows and columns of the matrix is displayed on the screen display means.

3. The defect review apparatus according to claim 2, wherein:

the defect review apparatus further comprises storage means for storing the classification results provided from the automatic defect classification processor and the results of the manpower-based manual classification of the defect images having undergone the automatic defect classification, and the automatic defect classification processor uses the automatic defect classification results and the manual classification results to produce not only a confusion matrix in which the number of defects classified by the automatic defect classification in each of the categories and the number of defects classified by the manual classification in each of the categories are arranged on a category basis, but also the judgment information and displays the confusion matrix and the judgment information on the screen display means.

4. The defect review apparatus according to claim 2, wherein:

the judgment information is the purity or the correctness rate of the number of defects in each of the categories.

5. The defect review apparatus according to claim 4, wherein:

the purity is displayed in an enhanced manner in the confusion matrix.

6. The defect review apparatus according to claim 1, wherein:

the judgment information is a category that requires manpower-based manual classification, a rate representing how many defects does not require the manpower-based manual classification, and the rate at which a defect of interest is missed.

* * * * *